(12) United States Patent
Yuan

(10) Patent No.: US 11,528,535 B2
(45) Date of Patent: Dec. 13, 2022

(54) VIDEO FILE PLAYING METHOD AND APPARATUS, AND STORAGE MEDIUM

(71) Applicant: TENCENT TECHNOLOGY (SHENZHEN) COMPANY LIMITED, Shenzhen (CN)

(72) Inventor: Jiaping Yuan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/085,797

(22) Filed: Oct. 30, 2020

(65) Prior Publication Data

US 2021/0051374 A1 Feb. 18, 2021

Related U.S. Application Data

(63) Continuation of application No. PCT/CN2019/114292, filed on Oct. 30, 2019.

(30) Foreign Application Priority Data

Nov. 19, 2018 (CN) .......................... 201811377143.9

(51) Int. Cl.
*G06F 3/048* (2013.01)
*H04N 21/472* (2011.01)
(Continued)

(52) U.S. Cl.
CPC ..... *H04N 21/47205* (2013.01); *G06F 3/0482* (2013.01); *G06T 13/80* (2013.01); *H04N 21/8146* (2013.01)

(58) Field of Classification Search
CPC ......... H04N 21/47205; H04N 21/8146; H04N 21/8545; H04N 21/44213; H04N 21/816;
(Continued)

(56) References Cited

U.S. PATENT DOCUMENTS 6,057,833 A * 5/2000 Heidmann ........... G11B 27/034
345/474
6,268,864 B1 * 7/2001 Chen ...................... G06T 13/80
345/428
(Continued)

FOREIGN PATENT DOCUMENTS

CN 102868919 A 1/2013
CN 103108248 A 5/2013
(Continued)

OTHER PUBLICATIONS

The World Intellectual Property Organization (WIPO) International Search Report for PCT/CN2019/114292 dated Jan. 10, 2020 6 Pages (including translation).
(Continued)

*Primary Examiner* — Steven B Theriault
(74) *Attorney, Agent, or Firm* — Anova Law Group, PLLC

(57) ABSTRACT

This application discloses a video file playing method and apparatus, and a storage medium. The video file playing method includes playing an animation file frame by frame according to a playback time of a video file, the video file comprising at least one displayed object, and the animation file comprising an animation element generated according to the displayed object; determining click/tap position information of a screen clicking/tapping event in response to the screen clicking/tapping event being detected; determining an animation element display area corresponding to the click/tap position information of the screen clicking/tapping event in the animation file according to the click/tap position information; determining, according to the corresponding animation element display area, an animation element triggered by the screen clicking/tapping event; and determining
(Continued)

Determine, for any animation element display area in the animation file, a pair of pixel point coordinates included in the animation element display area according to a pair of starting point coordinates of the animation element display area, and a width value and a height value of the animation element display area ⟶ S741

Determine, in a case that the pixel point coordinates included in the click/tap area coincide with at least one pair of pixel point coordinates included in the animation element display area, the animation element display area as the animation element display area overlapping the click/tap area in the animation file ⟶ S742 an interactive operation corresponding to the triggered animation element and performing the interactive operation.

20 Claims, 12 Drawing Sheets

(51) Int. Cl.
  *G06T 13/80* (2011.01)
  *H04N 21/81* (2011.01)
  *G06F 3/0482* (2013.01)
(58) Field of Classification Search
  CPC ......... H04N 21/4312; H04N 21/23418; H04N 21/6587; G06T 13/80; G06T 13/00; G06F 3/0482; G06F 3/04845; G11B 27/10
  See application file for complete search history.

(56) References Cited

U.S. PATENT DOCUMENTS

| | | | | |
|---|---|---|---|---|
| 7,675,520 | B2* | 3/2010 | Gee | G06T 13/00 345/473 |
| 7,990,386 | B2* | 8/2011 | Foote | G11B 27/10 345/473 |
| 8,171,430 | B1* | 5/2012 | Lozben | G06F 3/038 715/861 |
| 8,527,359 | B1* | 9/2013 | Varadhan | G06Q 30/0641 348/E7.054 |
| 9,071,885 | B2* | 6/2015 | Landers | H04N 5/76 |
| 9,373,186 | B2* | 6/2016 | Johnston | G06F 3/0482 |
| 9,471,203 | B1* | 10/2016 | O'Dell, III | G06F 3/04886 |
| 9,508,176 | B2* | 11/2016 | Lucas | G06T 13/20 |
| 9,532,106 | B1* | 12/2016 | Gupta | H04N 21/25883 |
| 9,558,578 | B1* | 1/2017 | Schnitzer | G06T 13/20 |
| 9,612,714 | B2* | 4/2017 | Moore | G06F 9/453 |
| 9,665,965 | B2* | 5/2017 | Netter | G06F 16/748 |
| 10,127,632 | B1* | 11/2018 | Burke | G06T 3/4038 |
| 10,270,983 | B1* | 4/2019 | Van Os | H04N 5/2621 |
| 10,325,394 | B2* | 6/2019 | Wang | G06F 3/1454 |
| 10,546,409 | B1* | 1/2020 | Subramonyam | G11B 27/34 |
| 10,599,289 | B1* | 3/2020 | Voss | G06F 3/0488 |
| 10,616,666 | B1* | 4/2020 | Pontiff | G06T 11/203 |
| 10,721,526 | B2* | 7/2020 | Rashba | H04N 21/4438 |
| 10,769,682 | B1* | 9/2020 | McDonald | G06F 3/0488 |
| 10,809,956 | B1* | 10/2020 | Bragdon | G06F 3/14 |
| 11,070,894 | B2* | 7/2021 | Lewis | H04N 21/8545 |
| 2001/0026277 | A1* | 10/2001 | Dorrell | H04N 19/70 375/E7.199 |
| 2003/0046348 | A1* | 3/2003 | Pinto | G06Q 10/107 709/206 |
| 2003/0103076 | A1* | 6/2003 | Neuman | G11B 27/031 715/723 |
| 2003/0169303 | A1* | 9/2003 | Islam | G06F 3/04817 715/836 |
| 2004/0128093 | A1* | 7/2004 | Cragun | G06Q 10/109 702/79 |
| 2006/0080167 | A1* | 4/2006 | Chen | G06Q 30/02 705/14.68 |
| 2007/0030273 | A1* | 2/2007 | Chen | G06T 13/00 345/949 |
| 2007/0153004 | A1* | 7/2007 | Airey | G06T 13/00 345/473 |
| 2007/0250901 | A1* | 10/2007 | McIntire | H04N 21/8586 725/146 |
| 2007/0262999 | A1* | 11/2007 | Bridger | A63F 13/57 345/473 |
| 2008/0122849 | A1* | 5/2008 | Wang | H04L 51/04 345/473 |
| 2008/0165195 | A1* | 7/2008 | Rosenberg | G06T 13/40 345/473 |
| 2008/0291218 | A1* | 11/2008 | Sheng | G06T 13/00 345/473 |
| 2009/0220206 | A1* | 9/2009 | Kisliakov | H04N 7/181 386/353 |
| 2010/0110082 | A1* | 5/2010 | Myrick | G06T 13/80 345/473 |
| 2010/0123737 | A1* | 5/2010 | Williamson | G06T 15/20 345/672 |
| 2010/0134499 | A1* | 6/2010 | Wang | G06T 13/80 345/473 |
| 2010/0156911 | A1* | 6/2010 | Zhao | G06F 3/14 345/474 |
| 2010/0177122 | A1* | 7/2010 | Netter | G06Q 30/02 345/473 |
| 2010/0318204 | A1 | 12/2010 | Daisy | |
| 2011/0170008 | A1* | 7/2011 | Koch | H04N 9/75 715/810 |
| 2012/0026174 | A1* | 2/2012 | McKeon | G06T 13/40 345/473 |
| 2012/0044250 | A1* | 2/2012 | Landers | H04N 21/858 345/473 |
| 2012/0123865 | A1* | 5/2012 | Salzano | G06Q 30/0257 705/14.55 |
| 2012/0139856 | A1* | 6/2012 | Ise | G06F 3/04883 345/173 |
| 2012/0185801 | A1* | 7/2012 | Madonna | H04N 21/42224 715/834 |
| 2012/0200574 | A1* | 8/2012 | Hill | G06F 9/453 345/473 |
| 2012/0266197 | A1* | 10/2012 | Andrews, II | H04N 21/2668 725/60 |
| 2012/0326993 | A1* | 12/2012 | Weisman | G09G 5/377 345/173 |
| 2013/0031463 | A1* | 1/2013 | Jaeger | G06F 3/0488 715/234 |
| 2013/0057555 | A1* | 3/2013 | Huang | G06T 13/80 345/473 |
| 2013/0094830 | A1* | 4/2013 | Stone | H04N 5/775 386/230 |
| 2013/0201194 | A1* | 8/2013 | Ko | G06F 3/0487 345/473 |
| 2014/0024449 | A1* | 1/2014 | Fox | A63F 13/005 463/31 |
| 2014/0026023 | A1* | 1/2014 | Cabanier | G06F 16/9577 715/202 |
| 2014/0026036 | A1* | 1/2014 | Jaeger | G06F 3/017 715/234 |
| 2014/0040808 | A1* | 2/2014 | Kim | G06F 3/04817 715/771 |
| 2014/0079371 | A1* | 3/2014 | Tang | H04N 21/234345 386/240 |
| 2014/0129990 | A1* | 5/2014 | Xin | G06F 3/0425 715/849 |
| 2014/0253560 | A1* | 9/2014 | Niles | G06T 13/80 345/473 |
| 2014/0267437 | A1* | 9/2014 | Mazzola | G06F 3/0488 345/661 |
| 2014/0280490 | A1* | 9/2014 | Artun | H04L 65/602 709/203 |
| 2014/0317511 | A1* | 10/2014 | Bailiang | G09B 29/106 715/730 |
| 2014/0355961 | A1* | 12/2014 | Paulus | G06T 13/80 386/282 |
| 2015/0146925 | A1* | 5/2015 | Son | G06F 3/017 382/103 |
| 2015/0178794 | A1* | 6/2015 | Sheng | G06T 3/20 705/14.73 |
| 2015/0279058 | A1* | 10/2015 | Dong | G06F 40/143 345/582 |
| 2015/0324096 | A1* | 11/2015 | Leblanc | H04N 21/41407 715/720 |
| 2015/0339006 | A1* | 11/2015 | Chaland | G06F 3/0485 715/835 |
| 2015/0346984 | A1* | 12/2015 | Flint | G06F 3/0842 715/720 |
| 2016/0110063 | A1* | 4/2016 | Connolly | G06F 3/0842 715/716 |
| 2016/0203626 | A1* | 7/2016 | Bostick | G06F 16/444 345/629 |
| 2016/0334973 | A1* | 11/2016 | Reckhow | H04N 21/472 |

(56) References Cited

U.S. PATENT DOCUMENTS

| | | | |
|---|---|---|---|
| 2016/0357353 A1* | 12/2016 | Miura | G06F 3/04842 |
| 2017/0032562 A1* | 2/2017 | Block | G06T 15/04 |
| 2017/0178685 A1* | 6/2017 | Zhang | G11B 27/34 |
| 2017/0188116 A1* | 6/2017 | Major | H04N 21/4147 |
| 2017/0286913 A1* | 10/2017 | Liu | H04W 4/12 |
| 2017/0357324 A1* | 12/2017 | Chaudhri | H04N 5/23245 |
| 2018/0182146 A1* | 6/2018 | Laaksonen | H04N 1/32203 |
| 2018/0184140 A1* | 6/2018 | Danker | H04N 21/2343 |
| 2018/0204372 A1* | 7/2018 | Sudheendra | G06F 1/1686 |
| 2018/0310043 A1 | 10/2018 | Wang | |
| 2018/0357245 A1* | 12/2018 | Garg | G11B 27/34 |
| 2019/0026006 A1* | 1/2019 | Ezzeddine | G06Q 10/1053 |
| 2019/0057722 A1* | 2/2019 | Key | G11B 27/34 |
| 2019/0132648 A1* | 5/2019 | Zimmerman | H04N 21/4316 |
| 2019/0266698 A1* | 8/2019 | Doll | G06T 13/80 |
| 2019/0378319 A1* | 12/2019 | Yuan | G06T 13/00 |
| 2021/0064229 A1* | 3/2021 | Chen | G06F 3/0482 |

FOREIGN PATENT DOCUMENTS

| | | | |
|---|---|---|---|
| CN | 104899912 A | | 9/2015 |
| CN | 105828160 A | | 8/2016 |
| CN | 105847998 A | | 8/2016 |
| CN | 106210808 A | | 12/2016 |
| CN | 108012179 A | | 5/2018 |
| CN | 108022279 A | | 5/2018 |
| CN | 108256062 A | | 7/2018 |
| CN | 108462883 A | | 8/2018 |
| CN | 110166842 A | | 8/2019 |
| WO | 2012103372 A2 | | 8/2012 |

OTHER PUBLICATIONS

The State Intellectual Property Office of the People's Republic of China (SIPO) Office Action 1 for 201811377143.9 dated Jan. 6, 2020 8 Pages (including translation).

The European Patent Office (EPO) The Extended European Search Report for 19886284.9 dated Sep. 30, 2021 8 Pages.

* cited by examiner

VIDEO FILE PLAYING METHOD AND APPARATUS, AND STORAGE MEDIUM

RELATED APPLICATIONS

This application is a continuation application of PCT Application No. PCT/CN2019/114292 filed on Oct. 30, 2019, which in turn claims priority to Chinese Patent Application No. 201811377143.9, entitled "VIDEO FILE OPERATING METHOD AND APPARATUS, AND STORAGE MEDIUM" and filed with the National Intellectual Property Administration, PRC on Nov. 19, 2018. Both applications are incorporated herein by reference in their entirety.

FIELD OF THE TECHNOLOGY

This application relates to the field of data processing technologies, and in particular, to a video file playing method and apparatus, and a storage medium.

BACKGROUND OF THE APPLICATION

Generally, video technology refers to various technologies for capturing, recording, processing, storing, transmitting and reproducing a series of static images. When a continuous image change rate exceeds 24 frames per second, according to the principle of visual persistence, human eyes cannot identify a single static picture. The pictures have a smooth and continuous visual effect, and the continuous pictures are referred to as video. The development in network technologies also facilitates video recording segments to exist on the Internet in the form of streaming media, and be received and played by terminal devices, such as computers and mobile phones.

In the existing video playback process, an interactive operation between a user and a video may include a video playback control operation, such as a video playback start and pause, a video playback volume adjustment, and a playback progress control operation.

SUMMARY

Embodiment of this application provide a video file playing method, performed by a terminal device. The method includes playing, in a video file playing process, an animation file frame by frame according to a playback time of a video file, the video file including at least one displayed object, and the animation file including an animation element generated according to the displayed object; determining click/tap position information of a screen clicking/tapping event in a case that the screen clicking/tapping event is detected in the video file playing process; determining an animation element display area matching the click/tap position information of the screen clicking/tapping event in the animation file according to the click/tap position information of the screen clicking/tapping event; determining, according to the matched animation element display area, an animation element triggered by the screen clicking/tapping even; and determining an interactive operation corresponding to the triggered animation element and performing the interactive operation.

Embodiments of this application provide a video file playing apparatus. The video file playing apparatus includes a playing unit, configured to play an animation file frame by frame according to a playback time of a video file, the video file comprising at least one displayed object, and the animation file comprising an animation element generated according to the displayed object; a first determining unit, configured to determine click/tap position information of a screen clicking/tapping event in response to the screen clicking/tapping event being detected in the video file playing process; a matching unit, configured to determine an animation element display area corresponding to the click/tap position information of the screen clicking/tapping event in the animation file according to the click/tap position information of the screen clicking/tapping event; a second determining unit, configured to determine, according to the matched animation element display area, an animation element triggered by the screen clicking/tapping event; and the playing unit, further configured to determine an interactive operation corresponding to the triggered animation element, and perform the interactive operation.

Embodiments of this application further provide a non-transitory computer-readable medium, storing a computer program executable by a terminal device, the program, when run on the terminal device, causing the terminal device to perform operations of any one of the foregoing video file playing methods.

BRIEF DESCRIPTION OF THE DRAWINGS

The accompanying drawings described herein are used to provide further in standing of this application, and form a part of this application. Exemplary embodiments of this application and descriptions thereof are used to explain this application, and do not constitute any inappropriate limitation to this application. In the accompanying drawings.

DESCRIPTION OF EMBODIMENTS

In order to implement interaction between a user and a displayed object in a video file and improve experience of an interactive operation between the user and the video, embodiments of this application provide a video file playing method and apparatus, and a storage medium.

The following describes the embodiments of the application with reference to the accompanying drawings of the specification. It is to be understood that the embodiments described herein are merely used for illustrating and explaining this application, but are not intended to limit this application. In addition, the embodiments of this application and features in the embodiments may be mutually combined in a case of no conflict.

First, some terms in the embodiments of this application are described below to facilitate understanding by a person skilled in the art.

Canvas: a part of HTML5 that allows a scripting language to render a bitmap dynamically.

Video mark: the HTML5 defines an annotation method for marking a video by using a video element. The video element may be used for playing a video.

A terminal device in this application may be a personal computer (PC), a tablet computer, a personal digital assistant (PDA), a personal communication service (PCS) phone, a notebook computer, a mobile phone, or another terminal device. The terminal device may alternatively be a computer having a mobile terminal, such as a portable, pocket-sized, handheld, computer built-in, or in-vehicle mobile apparatus, which can provide an audio and/or a data connectivity device for a user, and exchange language and/or data with a radio access network.

In addition, in the specification, claims, and accompanying drawings in the embodiments of this application, the terms "first", "second", and the like are intended to distinguish between similar objects rather than describe a specific order or sequence. It is to be understood that the data used in such a way are interchangeable in proper cases, so that the embodiments described herein can be implemented in other orders than the order illustrated or described herein.

"Plurality of or several" mentioned in the specification means two or more. "And/or" describes an association relationship of associated objects and represents that three relationships may exist. For example, A and/or B may represent the following three cases: only A exists, both A and B exist, and only B exists. The character "/" in this specification generally indicates an "or" relationship between the associated objects.

Figure 1:
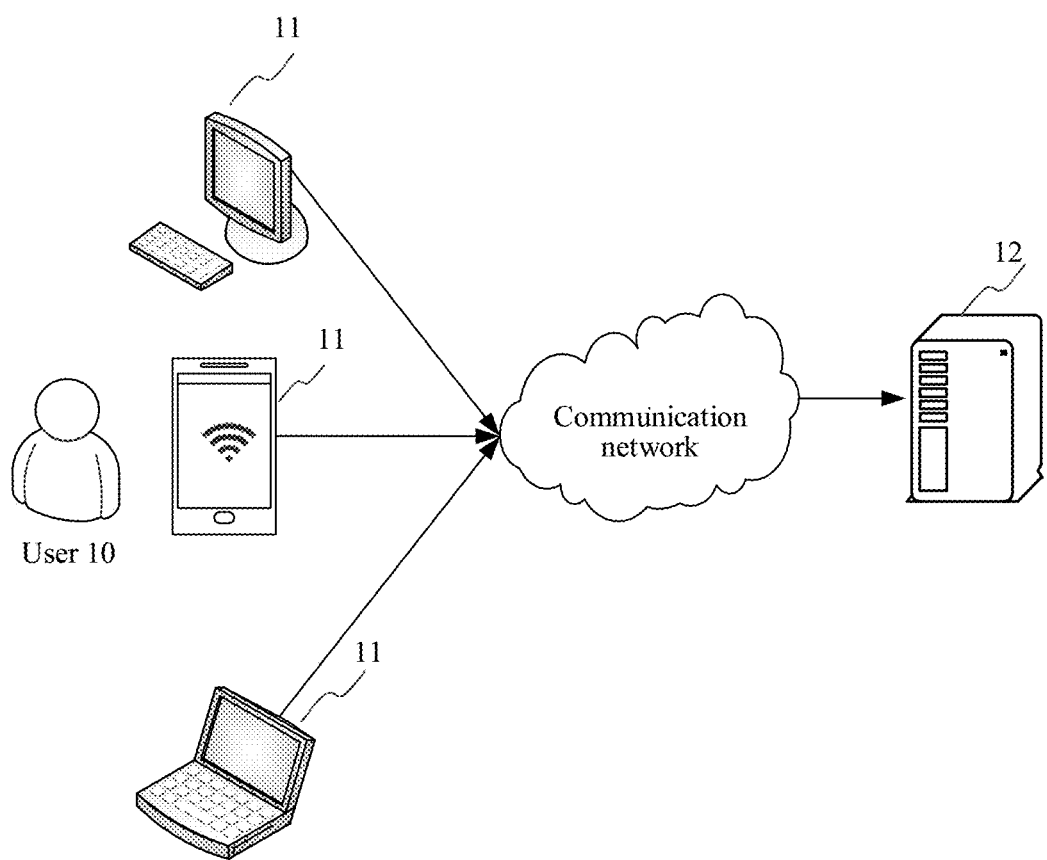
FIG. 1 is a schematic diagram of an application scenario of a video file playing method according to an embodiment of this application.

FIG. 1 is a schematic diagram of an application scenario of a video file playing method according to an embodiment of this application. A user 10 accesses a server 12 through a client installed in a terminal device 11. The client may be a web browser or an application program client installed in a terminal device, such as a mobile phone or a tablet computer. The server 12 may provide different services for the user 10, such as a video playing service and a game service.

The terminal device 11 is communicatively connected to the server 12 through a network. The network may be a local area network, a cellular network, a wide area network, or the like. The terminal device 11 may be a portable device (such as a mobile phone, a tablet computer, or a notebook computer), or may be a PC. The server 12 may be any device capable of providing Internet services.

The existing interactive operation between a user and a video is limited only to a control operation of video playback by the user, while the user cannot further interact with a displayed object, that is, a character in the video. In view of this, the embodiments of this application provide a video file playing method to detect an interaction between the user and the displayed object in the video. Video resources involved in the embodiments of this application include two parts of content: one is an animation file and the other is a video file. The animation file may use an animation editing tool, such as a Flash software to generate an animation effect and a logical information file, and the video file may be an MP4-format file or the like. The video file includes at least one displayed object. The animation file includes an animation element generated according to each displayed object in each video frame in the video file. The animation element is used for identifying a display area of the corresponding displayed object.

In order to implement the interaction between the user and the character in the video, the embodiments of this application first determine a position of the animation element corresponding to the displayed object according to the displayed object in each video frame in the video file. That is, one video frame may be used to determine one or more corresponding animation elements. The embodiments of the present application may then use an animation production software to produce the animation file, the animation file including the animation element corresponding to the displayed object in each video frame in the video. A movement position of the animation element and a movement position of the displayed object in the video file may remain consistent with each other by synchronously playing the animation file frame by frame with the playing of the video. In this way, an interactive operation between the user and the displayed object in the video file may be recognized by recognizing a position of a screen clicking/tapping operation of the user and a position of the animation element. Further, a corresponding interactive result may be displayed according to a recognition result of the interactive operation between the user and the displayed object in the video. For example, the interactive operation is rewarded or scored, and when the score reaches a specific value, membership upgrading, game clearance or interactive rewarding may be performed.

Figure 2:
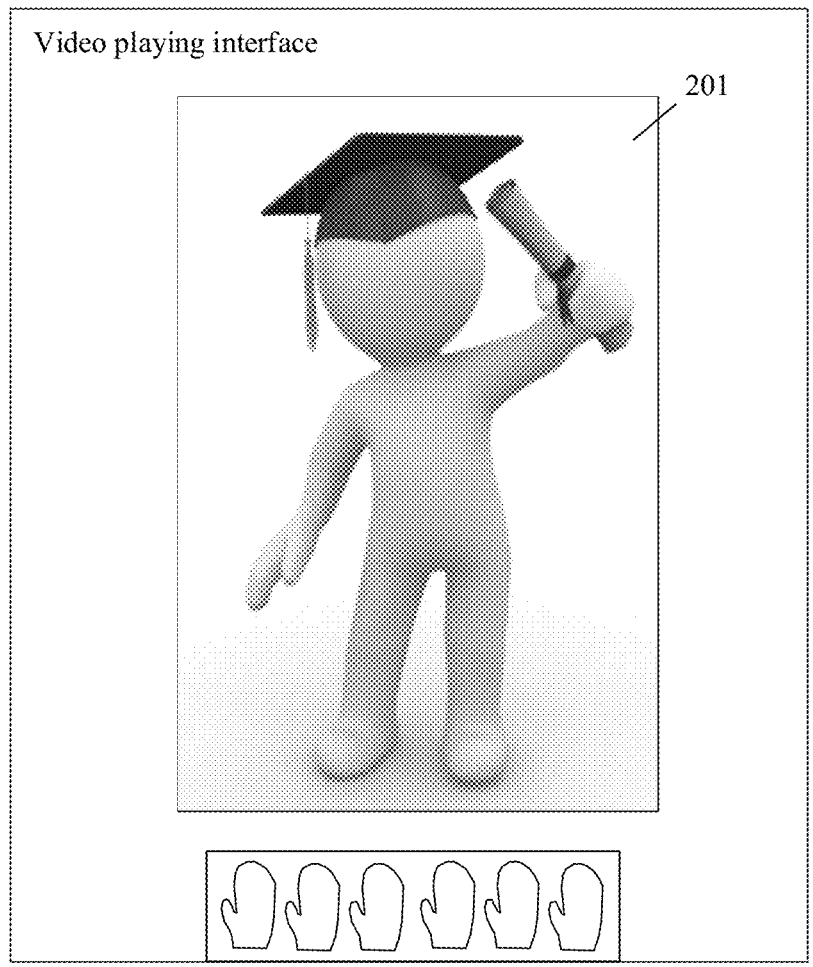
FIG. 2 is a schematic diagram of a video file according to an embodiment of this application.
Figure 3:
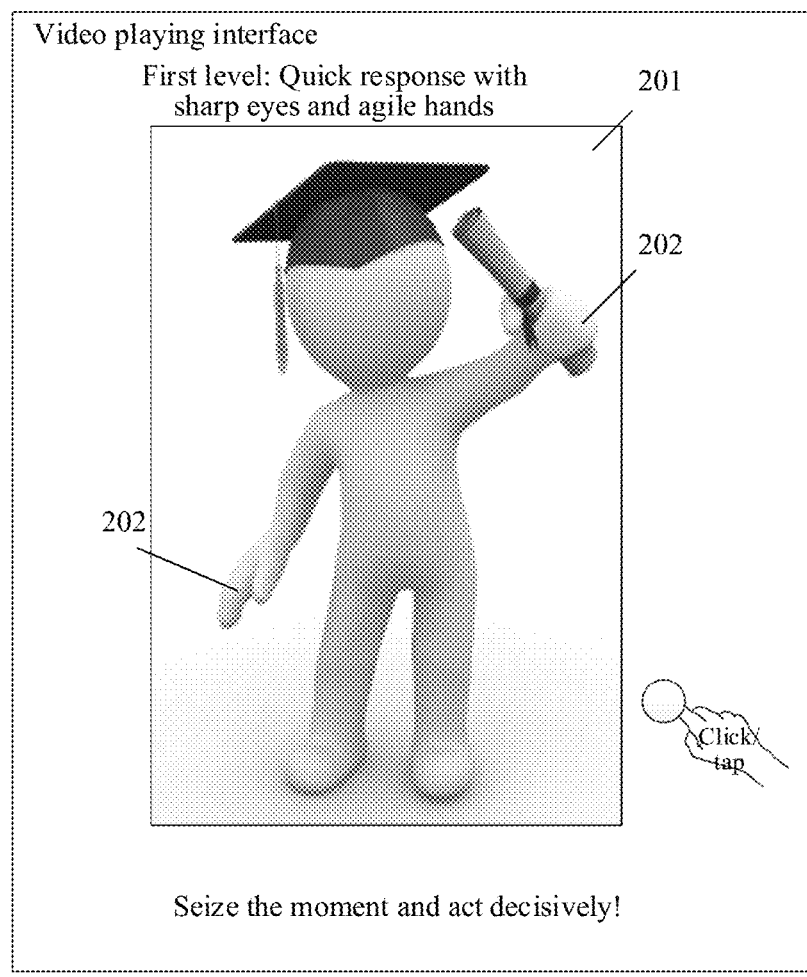
FIG. 3 is a schematic diagram of a generated animation file according to an embodiment of this application.
Figure 4:
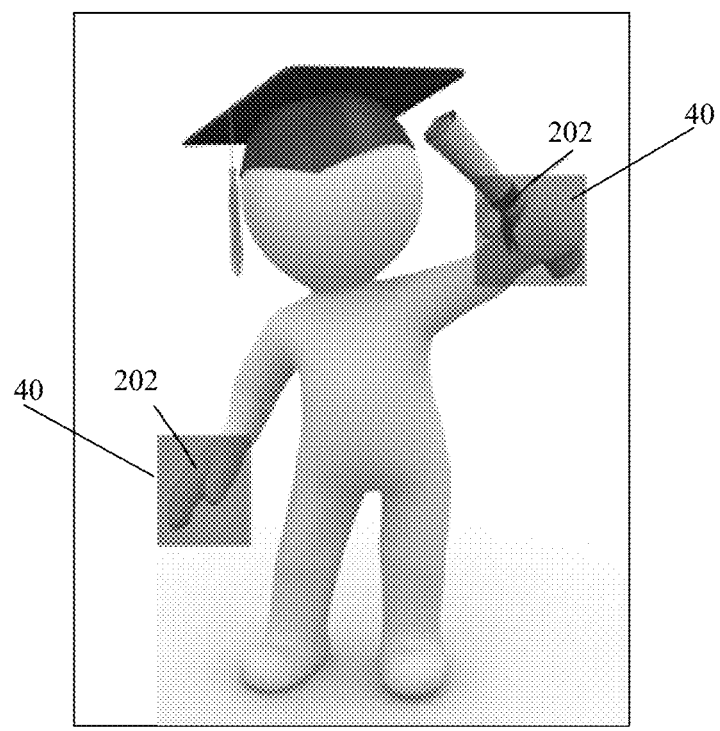
FIG. 4 is a schematic diagram of an animation frame including an animation element according to an embodiment of this application.
Figure 5:
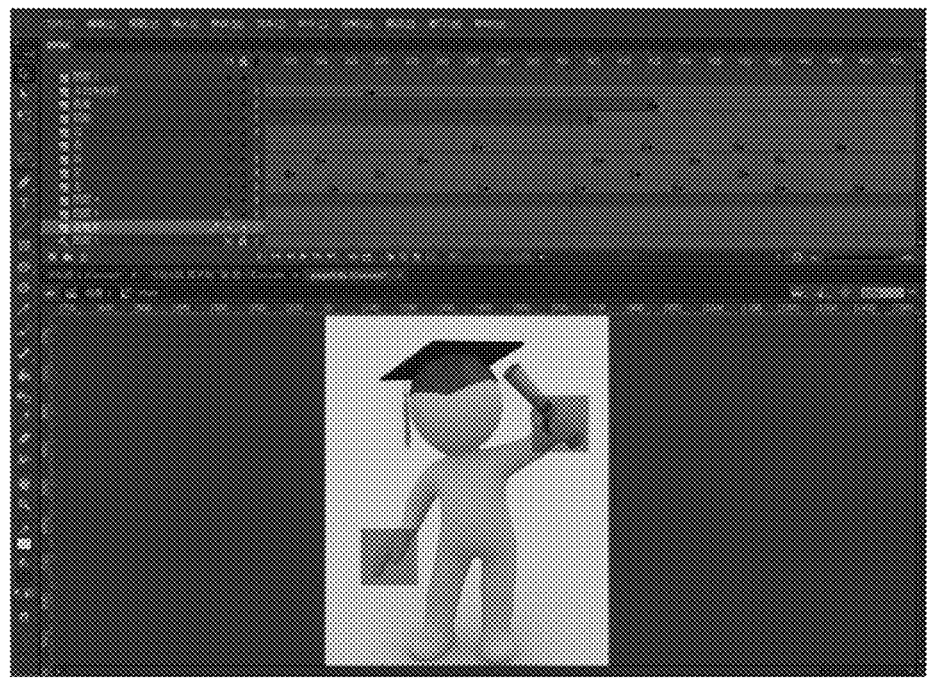
FIG. 5 is a schematic diagram of a frame editing environment of animation making software according to an embodiment of this application.

Using a frame of image in the video file shown in FIG. 2 as an example, in an embodiment of this application, a corresponding animation file is made for a frame image 201 shown in FIG. 2, the made animation file including an animation element corresponding to a displayed object in the frame image 201 shown in FIG. 2, as shown in FIG. 3. In this example, a displayed object 202 may be hands of a character in the frame image 201, so that the animation element corresponds to the hands of the character in the frame image 201 of the video file. In some embodiments, the animation element may be a rectangular box that is in the animation file and that represents a position of the hands of the character 202. As shown in FIG. 4, a rectangular box 40 is an animation element made by using the animation making software for representing the position of the displayed object 202 in the video. FIG. 5 is a schematic diagram of a frame editing environment of animation making software. The rectangular box 40 that is in FIG. 4 and that represents the position of the hands of character 202 is placed in the frame corresponding to the frame image 201 in the animation file. With the playing of the video, the rectangular box corresponding to each video frame in each frame of such an animation file will be played frame by frame synchronously with the playing of the video, so that a movement position of the rectangular box remains consistent with the movement position of the displayed object in the video.

In some embodiments, when the user clicks/taps a screen, it is determined whether a click/tap position of the user matches the position of the rectangular box representing the displayed object in the video, and if yes, it is determined that the user has triggered the displayed object in the video.

For example, when the user clicks/taps the screen, it is determined whether the click/tap position of the user is the same as the position of the rectangular box representing the displayed object in the video, and if yes, it is determined that the user has triggered the displayed object in the video. When it is determined that the user has triggered the displayed object in the video, that is, when it is determined that the user has triggered the animation element, an interactive operation corresponding to the animation element is performed. The interactive operation may be to perform a corresponding response operation, such as scoring the user, to implement interaction between the user and the displayed object in the video.

Figure 6A:
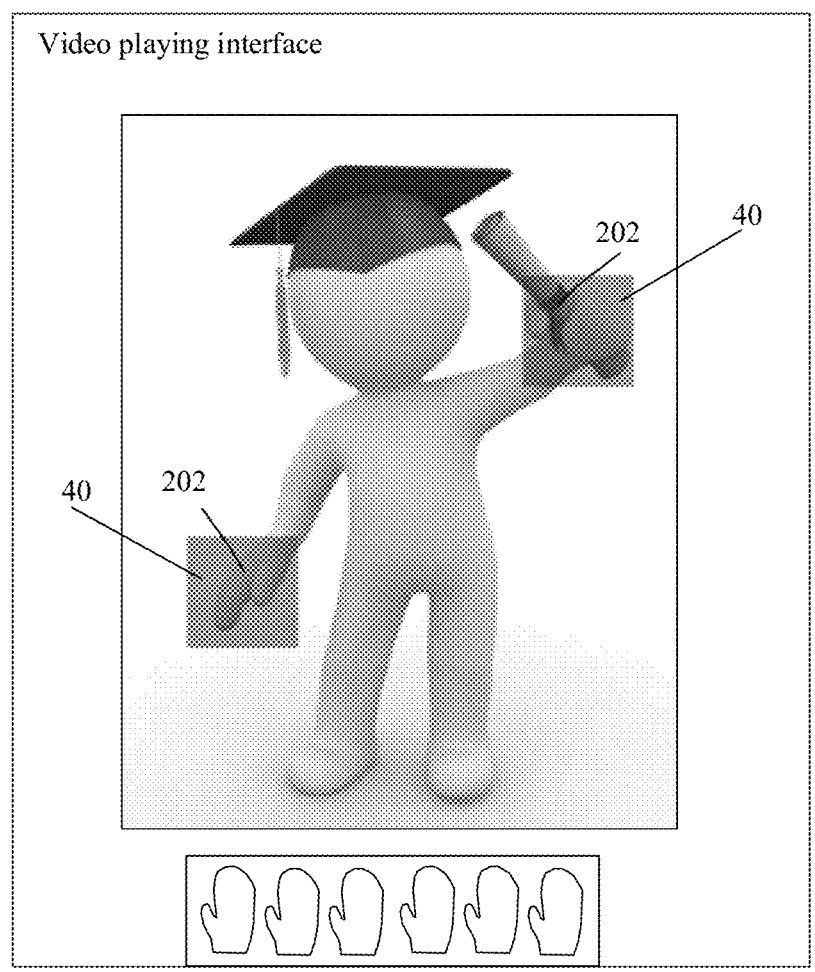
FIG. 6A is a schematic diagram of a video playing interface after a combination of an animation file and a video file according to an embodiment of this application.

FIG. 6A is a schematic diagram of a video playing interface after a combination of an animation file and a video file. With playing of the video, animation frames are synchronously played, and a movement position of a rectangular box 40 is always consistent with a movement position of hands 202 of a character in the video file. In this way, when a user clicks/taps a screen, it is determined whether a click/tap position of the user is the same as a position of the rectangular box 40 representing the hands 202 of the character in the video, to determine whether the user has triggered the hands 202 of the character in the video. A corresponding response operation may be performed according to a determining result. For example, the user is scored, and if it is determined that the user has triggered the hands, 10 may be added; otherwise, no score will be added, to implement interaction between the user and a displayed object in the video.

Alternatively, when it is determined that the user has triggered the displayed object in the video, that is, when it is determined that the user has triggered the animation element, an interactive operation corresponding to the animation element is performed. The interactive operation may be a preset behavior feedback performed by the character in the video. For example, when it is determined that the user has triggered the hands of the character in the video, real-time hand-clapping interaction between the user and the character in the video may be triggered.

In some embodiments, the animation file may be played frame by frame in a hidden layer according to a playback time of the video file, that is, the animation file synchronously played with the video file is invisible to the user. The animation file may be used for determining whether a screen clicking/tapping operation of the user triggers (or hits) a display position of the displayed object in the video file, and identifying the interactive operation between the user and the displayed object in the video according to a determining result.

Figure 6B:
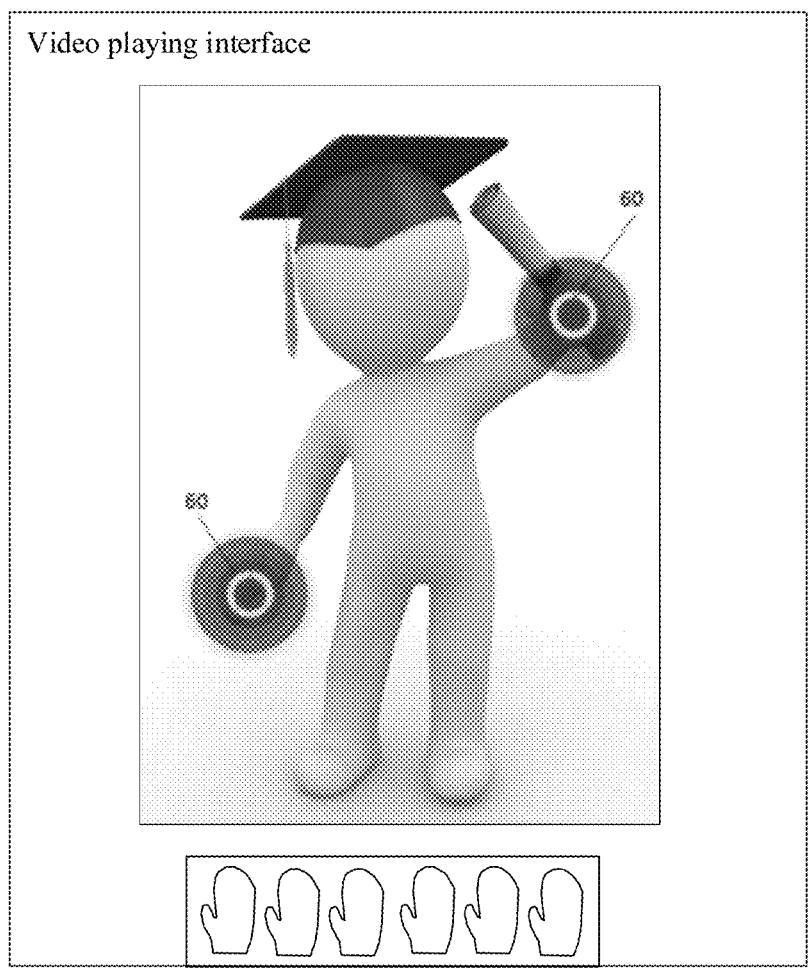
FIG. 6B is a schematic diagram of another video playing interface after a combination of an animation file and a video file according to an embodiment of this application.

FIG. 6B is a schematic diagram of another video playing interface after a combination of an animation file and a video file. In some embodiments, in order to guide the interactive operation between the user and the displayed object in the video file, an operation guidance area may further be added into the animation file. As shown in a circular region 60 in FIG. 6B, the operation guidance area is visible to the user and the operation guidance area may be larger than the foregoing animation element display area, to facilitate recognition by the user.

In the embodiments of this application, in a process of playing the video file, a current animation frame that is to be played may be determined according to a position of a current playback head of the video file and a frame rate of a video playback. For example, the animation frame that is to be played currently may be determined according to the following formula: position of animation frame=position of current playback head of video (seconds)*frame rate of video playback (frames/second). For example, if a position of a current playback head of a video is 1 second and a frame rate of video playback is 24 frames/second, it may be determined that the animation frame that is to be played currently is the $24^{th}$ frame.

The position of the foregoing playback head is a current playback position of the video file. For example, if a video file is currently played to the $16^{th}$ second, a current playback position of the video file is the $16^{th}$ second, that is, a position of a playback head is the $16^{th}$ second.

In some embodiments, in order to determine whether a screen clicking/tapping event of the user has triggered the animation element, in the embodiments of this application, a display position information set of the animation element in a video coordinate system may be established for the animation element. The display position information set in the video coordinate system includes display position information of the animation element corresponding to a displayed object in each video frame. Such display position information is a position information of the displayed object corresponding to the animation element at different display positions in the video. For any piece of display position information, the display position information may be represented as starting point coordinates of a display position $(x_0, y_0)$, and a width value $(w_1)$ and a height value $(h_1)$ of a display area, and the display position information corresponds to a rectangular display area in the video.

Because the video file may be played on terminal devices with different screen sizes, when the video is played, it is necessary to convert the video coordinate system into a screen coordinate system according to a display parameter of a display screen, to adapt to terminal screens with different sizes. The display parameter of the display screen may include a display screen size, a display resolution, and the like. In the embodiments of this application, display position information set of the animation element in the screen coordinate system is obtained by converting each display position information in the video coordinate system into corresponding display position information in the screen coordinate system. Each display position information in the screen coordinate system includes starting point information $(x_0', y_0')$, a display width value $w_2$ and a display height value $h_2$. Such display position information corresponds to a rectangular region on the display screen, the rectangular region including a plurality of pixel point coordinates.

Therefore, before the video file is played, according to the display parameter of the display screen of the terminal device, on which the video file is played, each piece of display position information included in the display position information set of the animation element in the video coordinate system is converted into display position information in the corresponding screen coordinate system, to obtain a corresponding display position information set. The display position information set in the screen coordinate system includes a plurality of pieces of display position information in the screen coordinate system. Each piece of display position information in the screen coordinate system corresponds to a corresponding rectangular region on the display screen, the rectangular region further including a plurality of pixel point coordinates.

In some embodiments, if the video file includes a plurality of displayed objects, the animation file correspondingly includes a display list composed of animation elements corresponding to the displayed objects in each video frame of the video file, the display list further including display position information of the animation elements in the video coordinate system and the screen coordinate system. Due to different display positions of a displayed object in different video frames, one displayed object may correspond to a plurality of animation elements at different display positions. Display position information of each animation element in each video frame in the video coordinate system and the screen coordinate system constitutes a prototype chain of each displayed object. Table 1 shows an example of a possible data structure of the display list:

TABLE 1

| Displayed object | Animation element | Display position information in video coordinate system | Display position information in video coordinate system |
|---|---|---|---|
| X1 | V1 | $((x_{01}, y_{01}), w_{01}, h_{01})$ | $((x_{01'}, y_{01'}), w_{01'}, h_{01'})$ |
|  | V2 | $((x_{02}, y_{02}), w_{02}, h_{02})$ | $((x_{02'}, y_{02'}), w_{02'}, h_{02'})$ |
|  | V3 | $((x_{03}, y_{03}), w_{03}, h_{03})$ | $((x_{03'}, y_{03'}), w_{03'}, h_{03'})$ |
|  | ... | ... | ... |
| X2 | V4 | $((x_{11}, y_{11}), w_{11}, h_{11})$ | $((x_{11'}, y_{11'}), w_{11'}, h_{11'})$ |
|  | V5 | $((x_{12}, y_{12}), w_{12}, h_{12})$ | $((x_{12'}, y_{12'}), w_{12'}, h_{12'})$ |
| ... | ... | ... | ... |

Figure 7A:
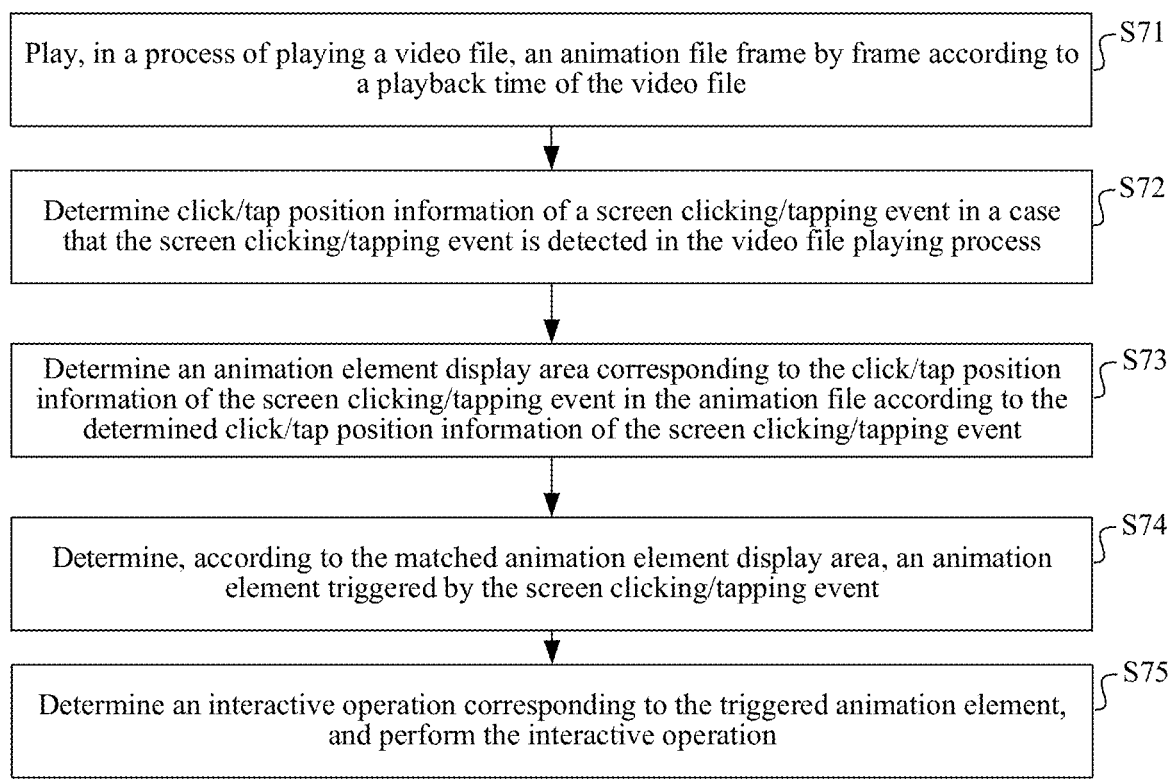
FIG. 7A is a schematic flowchart of implementing a video file playing method according to an embodiment of this application.

Based on an animation file generated by a displayed object included in a video file and a display list established for an animation element included in the animation file, the embodiments of this application provide a video file playing method. As shown in FIG. 7A, the method may include the following steps:

S71: Play, in a video file playing process, an animation file frame by frame according to a playback time of the video file, the video file including at least one displayed object, and the animation file including an animation element generated according to the displayed object.

In some embodiments, in the video file playing process, the animation file is correspondingly played frame by frame according to a current playback time of the video file, to keep a movement position of the animation element in each frame of the animation file consistent with a movement position of the displayed object in each video frame of the video file by playing each video frame of the video file synchronously with each frame of the animation file.

S72: Determine click/tap position information of a screen clicking/tapping event in a case that the screen clicking/tapping event is detected in the video file playing process.

In some embodiments, in the video file playing process, all the events of clicking/tapping a screen by a user are detected. When clicking/tapping of the screen by the user is captured, click/tap position information of the screen clicking/tapping event is determined. The click/tap position information may be represented as click/tap coordinates of clicking/tapping the screen by the user, that is, an abscissa X and an ordinate Y of clicking/tapping of the screen.

S73: Determine an animation element display area corresponding to the click/tap position information of the screen clicking/tapping event in the animation file according to the click/tap position information of the screen clicking/tapping event. The animation element display area corresponding to the click/tap position information of the screen clicking/tapping event may be a display area the same as the click/tap position information of the screen clicking/tapping event.

Figure 7B:
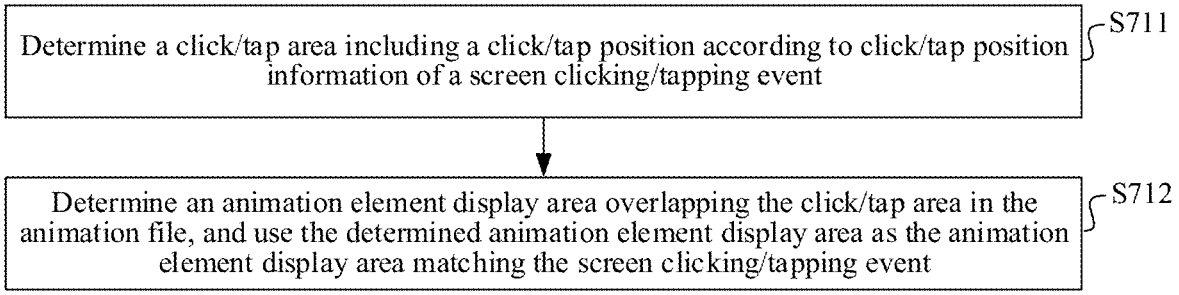
FIG. 7B is a specific schematic flowchart of step S72 according to an embodiment of this application.

In some embodiments, FIG. 7B is a specific schematic flowchart of step S72. As shown in FIG. 7B, step S72 includes the following steps:

S711: Determine a click/tap area including a click/tap position according to the click/tap position information of the screen clicking/tapping event.

S712: Determine an animation element display area overlapping the click/tap area in the animation file, and use the determined animation element display area as an animation element display area matching the screen clicking/tapping event.

In the embodiments of this application, in order to improve an accuracy of interactive operation detection, a certain tolerance may be added into detected click/tap coordinates to obtain a corresponding click/tap area, to simulate an area of a finger of the user. In some embodiments, a click/tap area included the click/tap coordinates is determined according to the click/tap coordinates. For example, a circular region with the click/tap coordinate as a center and L as a radius is determined as a click/tap area corresponding to a click/tap event, L being a preset value. In a specific implementation, the size of L may be set according to an actual requirement. This is not limited in the embodiments of this application. In another example, a rectangular region determined by using the click/tap coordinates as a center point and by using a preset length and width may alternatively be used as the click/tap region, or a square region determined by using the click/tap coordinates as a center point and by using a preset side length may be used as the click/tap area, and so on. The click/tap area may alternatively be another regular or irregular area. This is not limited in the embodiments of this application. Based on this, an animation element display area overlapping the click/tap area in the animation file is determined, and the determined animation element display area is used as the animation element display area matching the screen clicking/tapping event.

In some embodiments, for each displayed object in the video file, a position of the displayed object in each video frame may be different, that is, the position of each displayed object in each video frame may be movable. Therefore, the displayed object in the animation file may correspond to a plurality of animation elements. In the embodiments of this application, after a click/tap area corresponding to the screen clicking/tapping event is determined, corresponding display position information of each animation element in the screen coordinate system needs to be traversed sequentially, and whether the corresponding display position information coincides with the click/tap area is determined according to an animation element display area corresponding to the display position information.

Figure 8:
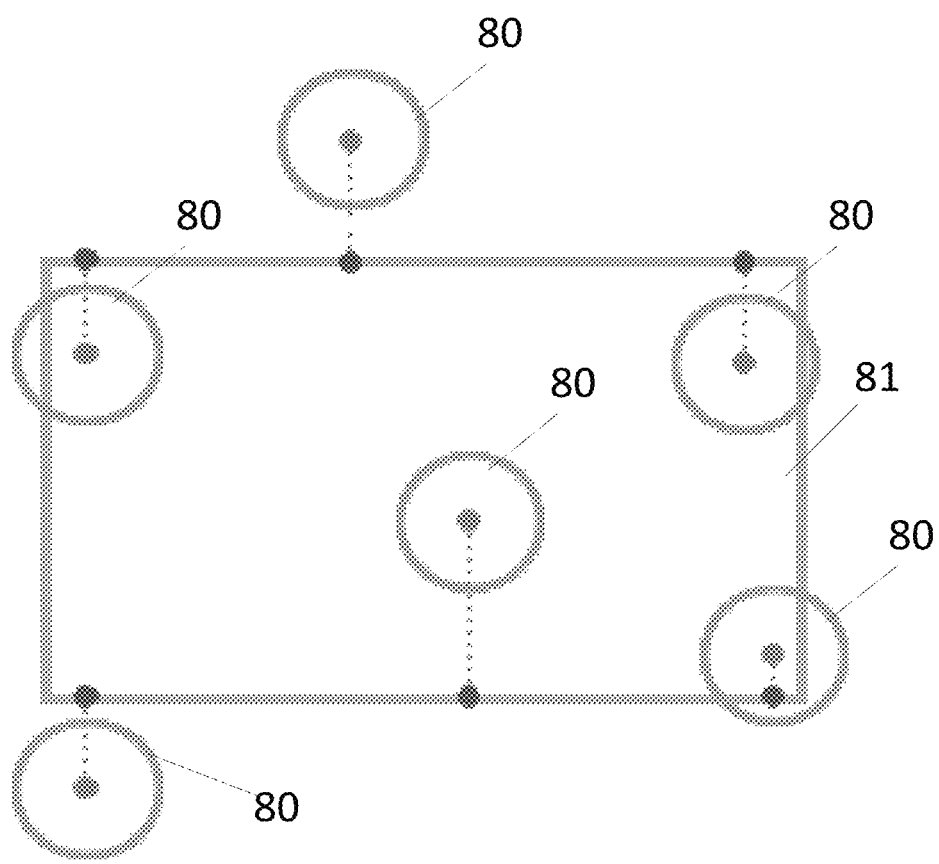
FIG. 8 is a schematic diagram of a relationship between a click/tap area and an animation element display area according to an embodiment of this application.

As shown in FIG. 8, a circular region 80 shown in FIG. 8 is the click/tap area determined in step S72. A rectangular region 81 in FIG. 8 is a display area of any animation element in a display screen. The display area may alternatively be referred to as an animation element display area. If the circular region 80 overlaps the rectangular region 81, it can be determined that a current screen clicking/tapping event has triggered the animation element.

In some embodiments, whether a circular region overlaps a rectangular region may be determined in the following manner: determining whether pixel point coordinates included in the click/tap area overlaps at least one pixel point coordinates included in the animation element display area, if yes, determining that the click/tap area overlaps the animation element display area, and if the pixel point coordinates included in the click/tap area does not overlap any pixel point coordinates included in the animation element display area, determining that the click/tap area does not overlap the animation element display area.

Figure 7C:
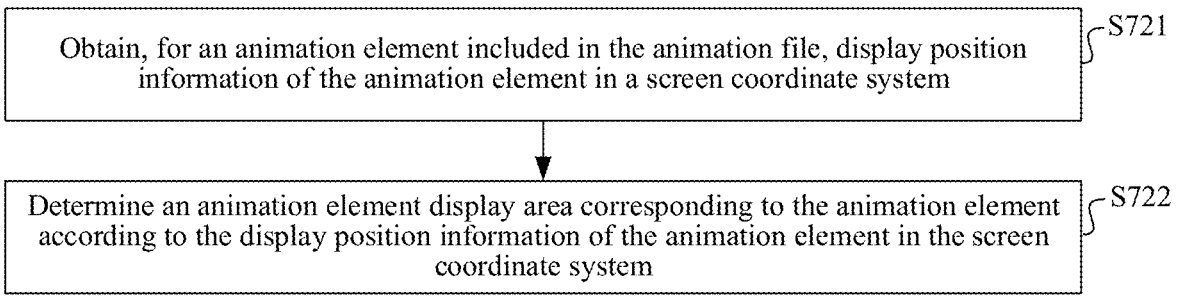
FIG. 7C is a specific schematic flowchart of determining an animation element display area corresponding to an animation element included in the animation file according to an embodiment of this application.

In some embodiments, before the animation element display area matching the screen clicking/tapping event is determined in the animation file according to the click/tap position of the screen clicking/tapping event, an animation element display area corresponding to an animation element included in the animation file may be further determined. FIG. 7C is a specific schematic flowchart of determining an animation element display area corresponding to an animation element included in the animation file. As shown is 7C, the specific schematic flowchart includes the following steps:

S721: Obtain, for any animation element included in the animation file, display position information of the animation element in a screen coordinate system.

S722: Determine an animation element display area corresponding to the animation element according to the display position information of the animation element in the screen coordinate system.

Figure 7D:
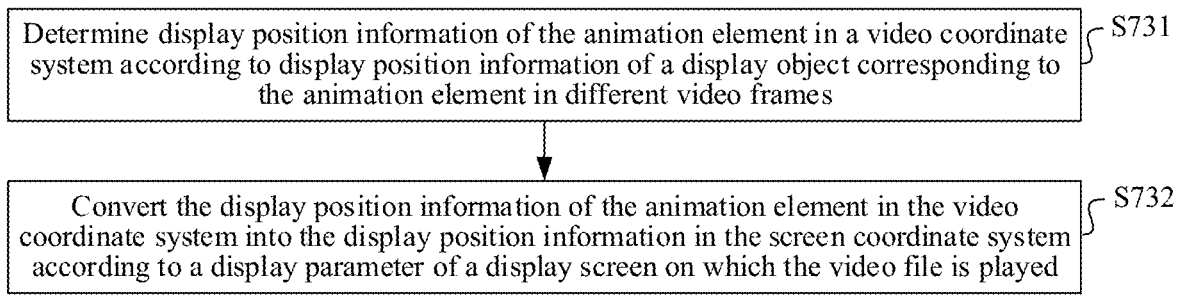
FIG. 7D is a specific schematic flowchart of obtaining display position information of an animation element in a screen coordinate system in step S721 according to an embodiment of this application.

FIG. 7D is a specific schematic flowchart of obtaining display position information of an animation element in a screen coordinate system in step S721. As shown in FIG. 7D, step S721 specifically includes the following steps:

S731: Determine display position information of the animation element in a video coordinate system according to display position information of a displayed object corresponding to the animation element in different video frames.

S732: Convert the display position information of the animation element in the video coordinate system into the display position information in the screen coordinate system according to a display parameter of a display screen on which the video file is played.

Figure 7E:
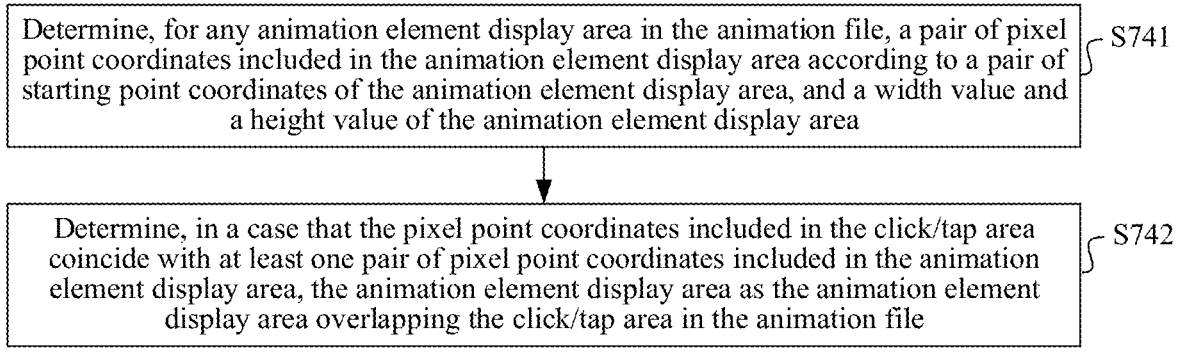
FIG. 7E is a specific schematic flowchart of determining an animation element display area overlapping the click/tap area in the animation file in S712 according to an embodiment of this application.

In some embodiments, the display position information includes starting point coordinates of the animation element display area, and a width value and a height value of the animation element display area. FIG. 7E is a specific schematic flowchart of determining an animation element display area overlapping the click/tap area in the animation file in S712. As shown in FIG. 7E, step S712 specifically includes the following steps:

S741: Determine, for any animation element display area in the animation file, pixel point coordinates included in the animation element display area according to starting point coordinates of the animation element display area, and a width value and a height value of the animation element display area.

S742: Determine, in a case that pixel point coordinates included in the click/tap area overlaps at least one pixel point coordinates included in the animation element display area, the animation element display area as the animation element display area overlapping the click/tap area in the animation file.

S74: Determine, according to the matched animation element display area, an animation element triggered by the screen clicking/tapping event. In some embodiments, if it is determined that the click/tap area matches an animation element display area corresponding to any animation element, it may further be determined whether the animation element is an animation element corresponding to a specified displayed object, for example, it is determined whether the animation element is an animation element representing hands of a character in a video, if yes, it is determined that the current screen clicking/tapping event triggers the animation element, and otherwise, the current screen clicking/tapping event is ignored.

S75: Determine an interactive operation corresponding to the triggered animation element and perform the interactive operation.

In some embodiments, the interactive operation may be to perform a corresponding response operation, for example, displaying a corresponding score to a user, or a preset behavior feedback made by a character in the video, such as a preset gesture.

In some embodiments, when it is determined that the user triggers the displayed object in the video, that is, when it is determined that the user triggers the animation element, an interactive operation corresponding to the animation element is performed. The interactive operation may be to perform a corresponding response operation, such as scoring the user, to implement interaction between the user and the displayed object in the video.

Alternatively, when it is determined that the user has triggered the displayed object in the video, that is, when it is determined that the user has triggered the animation element, an interactive operation corresponding to the animation element is performed. The interactive operation may be a preset behavior feedback performed by the character in the video, for example, when it is determined that the user triggers the hands of the character in the video, real-time hand-clapping interaction between the user and the character in the video is triggered.

Figure 9:
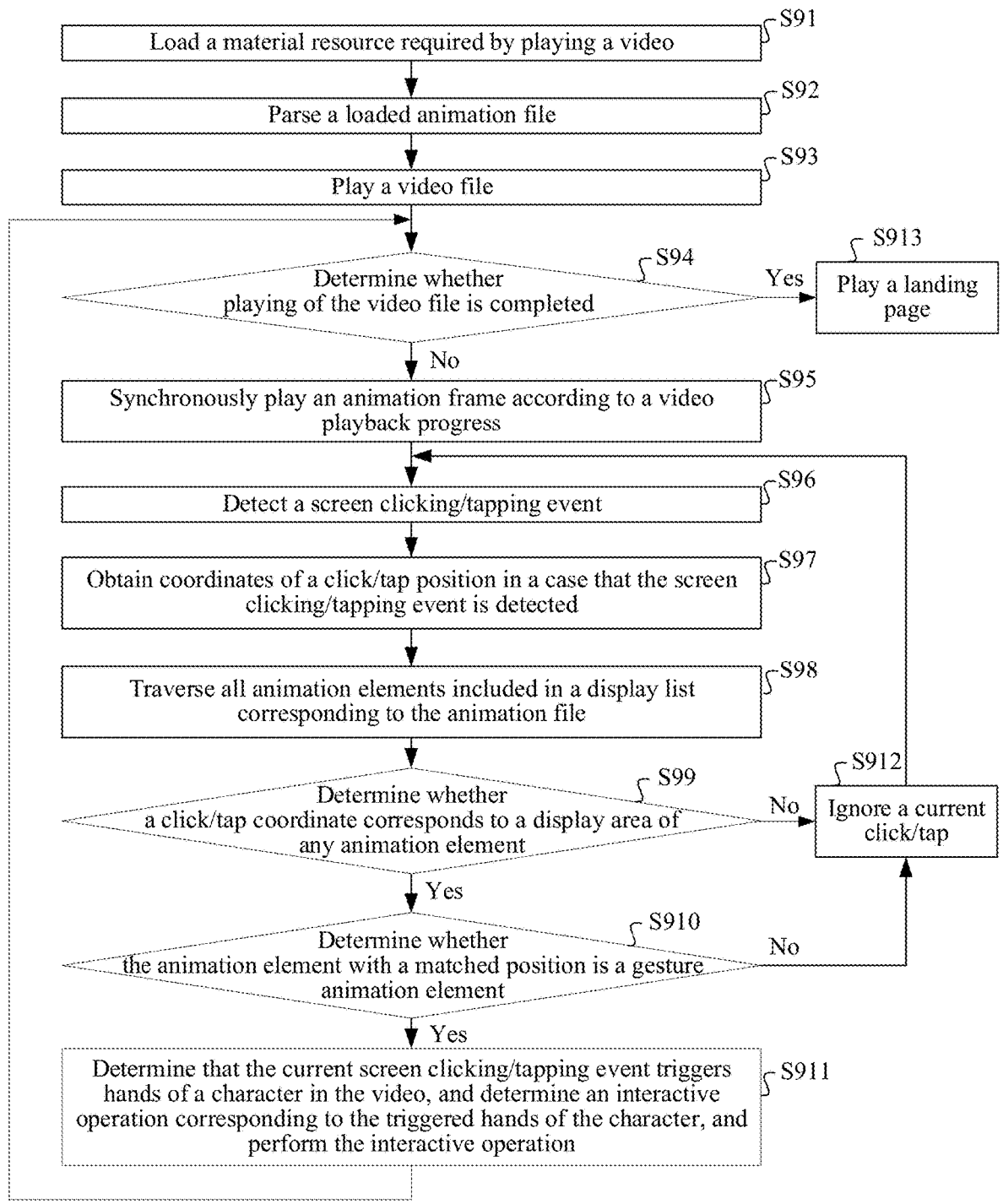
FIG. 9 is a schematic flowchart of implementing a video file playing method according to another embodiment of this application.

To better understand the embodiments of this application, an implementation process of the embodiments of this application is described with reference to a loading process of a video file or a game file. For ease of description, in the embodiments of this application, tracking a gesture in the video file as an example, as shown in FIG. 9, may include the following steps:

S91: Load a material resource required by playing a video.

In this step, the loaded material resource includes the video file and an animation file generated for the video file. A movement position of an animation element for tracking the gesture included in the animation file corresponds to a movement position of the hands of the character in the video file.

S92: Parse the loaded animation file.

In this step, the loaded animation element is parsed, the parsed animation is rendered on a canvas and then the canvas being placed above a video window. The animation rendered on the canvas is invisible for a user.

S93: Play the video file.

S94: Determine whether playing of the video file is completed, if yes, perform step S913, and otherwise, perform step S95.

S95: Synchronously play an animation frame according to a video playback progress.

In some embodiments, when the video file is played, a position of a playback head of a video is detected in real time. A frame position of the animation file that is to be played currently is calculated according to a frame rate of the video playback and a current position of the playback head. The animation frame played currently is changed according to a calculation result, to implement synchronization of a position of a gesture animation element and a position of the hands of the character in the video.

S96: Detect a screen clicking/tapping event.

S97: Obtain coordinates of a click/tap position in a case that the screen clicking/tapping event is detected.

The screen clicking/tapping event is detected in a video playing process. When an operation of clicking/tapping the screen by the user is captured, the coordinates of the click/tap position are recorded.

S98: Traverse all animation elements included in a display list corresponding to the animation file.

In some embodiments, after the screen clicking/tapping event is detected in the video playing process, all the animation elements in a canvas display list are traversed.

S99: Determine whether click/tap coordinates match any animation element display area, if yes, perform step S910; and otherwise, perform step S912.

In this step, a click/tap area corresponding to the click/tap coordinates is first determined according to the click/tap coordinates, and then according to pixel point coordinates included in the click/tap area, it is determined whether there is at least one pair of pixel point coordinates coincide with a pair of pixel point coordinates included in an animation element display area corresponding to at least one animation element included in the display list, if yes, it is determined that the click/tap coordinates match any animation element display area, and otherwise, it is determined that the click/tap coordinates do not match all of the animation element display areas.

S910: Determine whether the animation element with a matched position is the gesture animation element, if yes, perform step S911, and otherwise, perform step S912.

In this step, whether the animation element with the matched position is the gesture animation element is further determined. If yes, it may be determined that the current screen clicking/tapping event triggers the hands of the character in the video. Otherwise, the current operation may be ignored.

S911: Determine that the current screen clicking/tapping event triggers hands of a character in the video, and determine an interactive operation corresponding to the triggered hands of the character, perform the interactive operation, and return to perform step S94.

S912: Ignore a current click/tap and return to perform step S96.

S913: Play a landing page.

According to a video file playing method provided by the embodiments of this application, for a displayed object included in the video file generating an animation file of an animation element corresponding to the displayed object, when playing a video, an animation frame is played synchronously according to a video playback progress. In addition, a screen clicking/tapping event is detected. When detecting the screen clicking/tapping event, a corresponding click/tap area is determined according to click/tap position information of a current screen clicking/tapping event. It is determined whether the current screen clicking/tapping event triggers the animation element by comparing whether the click/tap area matches an animation element display area, thereby implementing a deep interaction between a user and the displayed object in the video, and improving an interaction experience between the user and the video. Since the user no longer only makes a stiff and boring interaction with the video by using a simple click/tap, but as if in the video, the user makes abundant interactions with a character in the video, thereby improving an initiative and an enthusiasm to participate in a video operation.

The video file playing method provided by the embodiments of this application may be applied to a client that includes a video player, such as a video playback client, or may be applied to a video playback web page. This is not limited in the embodiments of this application.

Based on the same inventive concept, the embodiments of this application further provide a video file playing apparatus. Because a principle for the foregoing apparatus to resolve a problem is similar to that of the video file playing method, for implementation of the apparatus, reference may be made to the implementation of the foregoing method. Repeated content is not described herein again.

Figure 10:
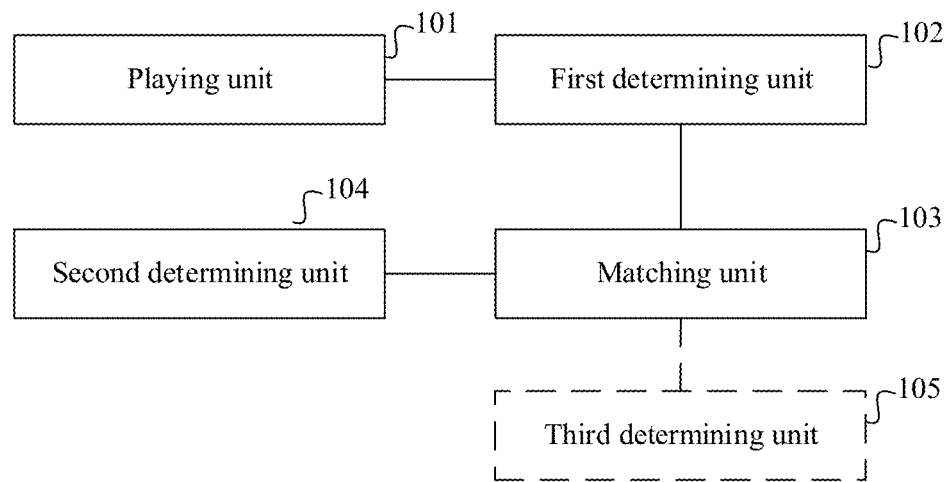
FIG. 10 is a schematic structural diagram of a video file playing apparatus according to an embodiment of this application.

FIG. 10 is a schematic structural diagram of a video file playing apparatus according to an embodiment of this application, including: a playing unit 101, configured to play, in a video file playing process, an animation file frame by frame according to a playback time of a video file, the video file including at least one displayed object, and the animation file including an animation element generated according to the displayed object; a first determining unit 102, configured to determine click/tap position information of a screen clicking/tapping event in a case that the screen clicking/tapping event is detected in the video file playing process; a matching unit 103, configured to determine an animation element display area matching the screen clicking/tapping event in the animation file according to the click/tap position information of the screen clicking/tapping event; a second determining unit 104, configured to determine an animation element corresponding to the matched display area as an animation element triggered by the screen clicking/tapping event to; and the playing unit 101, configured to determine an interactive operation corresponding to the triggered animation element, and perform the interactive operation.

In some embodiments, the matching unit 103 is configured to determine a click/tap area of a click/tap position according to the click/tap position information of the screen clicking/tapping event; and determine an animation element display area overlapping the click/tap area in the animation file, and use the determined animation element display area as the animation element display area matching the screen clicking/tapping event.

In some embodiments, the click/tap position information includes click/tap coordinates; and the matching unit 103 is configured to determine the click/tap area including the click/tap coordinates according to the click/tap coordinates of the screen clicking/tapping event.

In some embodiments, the video file playing apparatus provided in this embodiment of this application further includes: a third determining unit 105, configured to: before the matching unit determines, in the animation file according to the click/tap position information of the screen clicking/tapping event, the animation element display area corresponding to the click/tap position information of the screen clicking/tapping event, obtain, for any animation element included in the animation file, display position information of the animation element in a screen coordinate system, and determine an animation element display area corresponding to the animation element according to the display position information of the animation element in the screen coordinate system.

In some embodiments, the third determining unit 105 is configured to determine display position information of the animation element in a video coordinate system according to display position information of a displayed object corresponding to the animation element in different video frames; and convert the display position information of the animation element in the video coordinate system into the display position information in the screen coordinate system according to a display parameter of a display screen on which the video file is played.

In some embodiments, the display position information includes starting point coordinates of the animation element display area, and a width value and a height value of the animation element display area; and the matching unit 103 is configured to determine, for any animation element display area in the animation file, pixel point coordinates included in the animation element display area according to starting point coordinates of the animation element display area, and a width value and a height value of the animation element display area; and determine, in a case that pixel point coordinates included in the click/tap area overlaps at least one pixel point coordinate included in the animation element display area, the animation element display area as the animation element display area overlapping the click/tap area in the animation file.

In some embodiments, the playing unit 101 is configured to determine an animation frame in a current playback animation file according to a frame rate of a video playback and a current playback position of the video file.

In some embodiments, the interactive operation may be to perform a corresponding response operation, for example, displaying a corresponding score to a user, or a preset behavior feedback made by a character in the video, such as a preset gesture.

For ease of description, the foregoing components are respectively described as various modules (or units) divided according to functions. During implementation of this application, the function of the various modules (or units) may be implemented in a same piece of or multiple pieces of software or hardware. In some embodiments, a functional module or unit may include one or more computer programs stored in a computer readable medium. When executed by one or more processors, the one or more computer programs may implement the function of the corresponding module or unit. In some embodiment, a functional module or unit may be a combination of software and/or hardware components. When executed by one or more processors, the software components and/or the hardware components may implement the function of the corresponding module or unit.

After the video file playing method and apparatus of exemplary embodiments of this application are described, the following describes a computing apparatus according to another exemplary embodiment of this application.

A person skilled in the art can understand that various aspects of this application may be implemented as systems, methods, or computer program products. Therefore, each aspect of this application may be specifically implemented in the following forms, that is, the implementation form of complete hardware, complete software (including firmware and micro code), or a combination of hardware and software, which may be uniformly referred to as "circuit", "module", or "system" herein.

In some possible implementations, the computing apparatus according to this application may at least include at least one processor and at least one memory. The memory stores program code, the program code, when executed by the processor, causing the processor to perform the steps in the video file playing method described above in the specification according to various exemplary embodiments of this application. For example, the processor may perform step S72, namely, determine the click/tap position information of the screen clicking/tapping event in a case that the screen clicking/tapping event is detected in the video file playing process; step S73, namely, determine the animation element display area matching the screen clicking/tapping event in the animation file according to the determined click/tap position information of the screen clicking/tapping event; step S74, namely, determine the animation element corresponding to the matched animation element display area as the animation element triggered by the screen clicking/tapping event; and step S75, namely, determine the interactive operation corresponding to the triggered animation element and perform the interactive operation, as shown in FIG. 7A.

A computing apparatus 110 according to this embodiment of this application is described below with reference to FIG. 11. The computing apparatus 110 shown in FIG. 11 is only an example, and does not impose any restriction on functions and scopes of use of the embodiments of this application.

Figure 11:
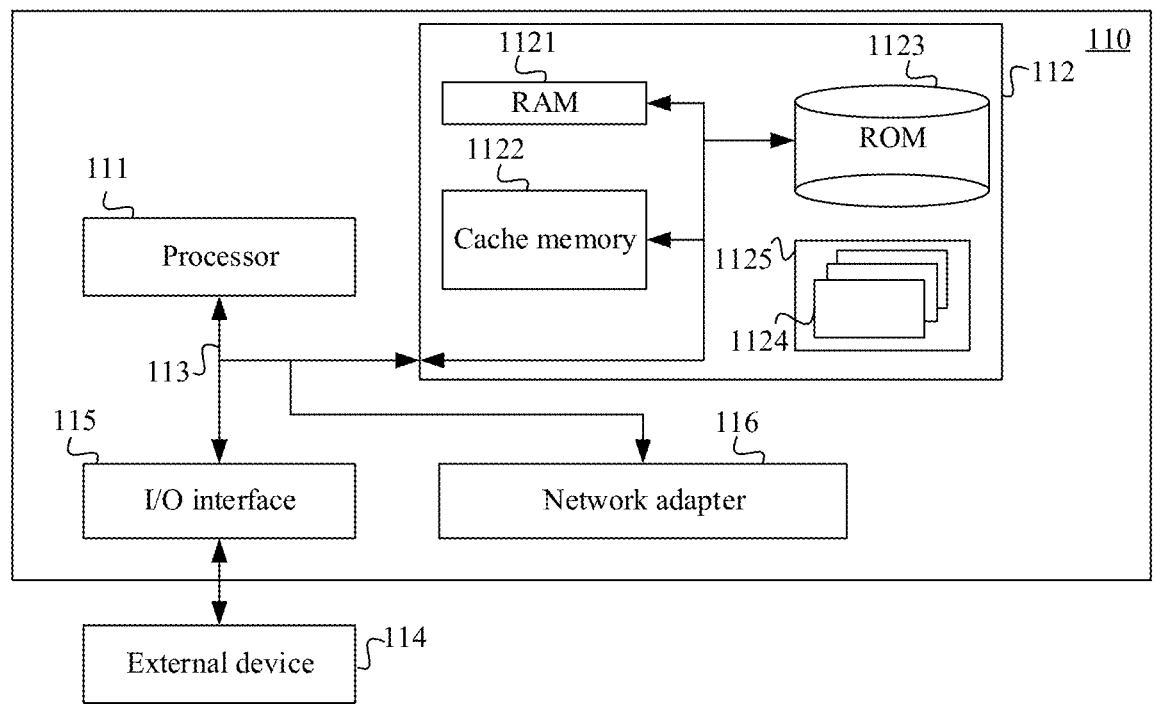
FIG. 11 is a schematic structural diagram of a computing apparatus according to an embodiment of this application.

As shown in FIG. 11, the computing apparatus 110 is shown in the form of a general computing device. Components of the computing apparatus 110 may include, but are not limited to: at least one of the foregoing processor 111, at least one of the foregoing memory 112, a bus 113 connected to different system components (including the memory 112 and the processor 111).

The bus 113 represents one or more of several types of bus structures, including a memory bus or a memory controller, a peripheral bus, a processor, or a local bus using any bus structure among various bus structures.

The memory 112 may include a readable medium in a form a volatile memory, such as a random access memory (RAM) 1121 and/or a cache memory 1122, and may further include a read-only memory (ROM) 1123.

The memory 112 may further include a program/utility 1125 having a set of (at least one) program modules 1124. Such program modules 1124 include, but are not limited to an operating system, one or more application programs, another program module, and program data. Each of such examples or a combination thereof may include an implementation of a network environment.

The computing apparatus 110 may further communicate with one or more external devices 114 (such as a keyboard, a pointing device), and may further communicate with one or more devices that enable a user to interact with the computing apparatus 110, and/or any device (such as a network card or a modem) that enables the computing apparatus 110 to communicate with one or more other computing devices. Such communication may be performed by using an input/output (I/O) interface 115. In addition, the computing apparatus 110 may further communicate with one or more networks, such as a local area network (LAN), a wide area network (WAN), and/or a public network, (such as the Internet) by using a network adapter 116. As shown in FIG. 11, the network adapter 116 communicates with other modules configured to the computing apparatus 110 by using the bus 113. It is to be understood that, although not shown in FIG. 11, other hardware and/or software modules may be used in combination with the computing apparatus 110, including, but not limited to: micro code, a device driver, a redundancy processor, an external disk drive array, a RAID system, a tape drive, a data backup storage system, and the like.

In some possible implementations, the aspects of the video file playing method provided in this application may be further implemented in a form of a program product, including program code. When the program product is run on a computer device, the program code is used for causing the computer device to perform the steps in the video file playing method according to various exemplary embodiments of this application. For example, the computer device may perform step S72, namely, determine the click/tap position information of the screen clicking/tapping event in a case that the screen clicking/tapping event is detected in the video file playing process; step S73, namely, determine the animation element display area matching the screen clicking/tapping event in the animation file according to the click/tap position information of the screen clicking/tapping event; step S74, namely, determine the animation element corresponding to the matched animation element display area as the animation element triggered by the screen clicking/tapping event; and step S75, namely, determine the interactive operation corresponding to the triggered animation element and perform the interactive operation, as shown in FIG. 7A.

The program product may use any combination of one or more computer-readable storage media. A readable medium may be a readable signal medium or a computer-readable storage medium. The computer-readable storage medium may be, for example, but not limited to, an electrical, magnetic, optical, electromagnetic, infrared, or semiconductor system, apparatus, or device, or any combination thereof. More specific examples of the computer-readable storage medium (a non-exhaustive list) include: an electrical connection having one or more wires, a portable disk, a hard disk, a RAM, a ROM, an erasable programmable ROM (EPROM or a flash memory), an optical fiber, a portable compact disk read-only memory (CD-ROM), an optical storage device, a magnetic storage device, or any appropriate combination thereof.

The program product used for the video file playing method according to an implementation of this application may use a CD-ROM, include program code, and may be run on the computing device. However, the program product in this application is not limited thereto. In this application, the computer-readable storage medium may be any tangible medium including or storing a program, and the program may be used by or used in combination with an instruction execution system, an apparatus, or a device.

The readable signal medium may include a data signal propagated in a baseband or as part of a carrier, and stores computer-readable program code. The propagated data signal may be in a plurality of forms, including but not limited to, an electromagnetic signal, an optical signal, or any appropriate combination thereof. The readable signal medium may alternatively be any readable medium other than the computer-readable storage medium. The readable medium may be used for sending, propagating, or transmitting a program used by or used in combination with an instruction execution system, an apparatus, or a device.

The program code included in the readable medium may be transmitted by using any appropriate medium, including but not limited to: a wireless medium, a wire, an optical cable, an RF, any appropriate combination thereof, or the like.

The program code used for executing the operations of this application may be written by using one or more programming languages or a combination thereof. The programming languages include an object-oriented programming language such as Java, C++ and the like, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. In a case involving a remote computing device, the remote computing device may be connected to a user computing device through any type of network including a local area network (LAN) or a wide area network (WAN), or may be connected to an external computing device (for example, through the Internet by using an Internet service provider).

Although several units or subunits of the apparatus are mentioned in detailed description above, such division is merely an example but not mandatory. In fact, according to the implementations of this application, features and functions of two or more units described above may be specified in one unit. On the contrary, the features or functions of one unit described above may further be divided and specified by a plurality of units.

In addition, although the operations of the method in this application are described in a specific order in the accompanying drawings. This does not require or imply that the operations have to be performed in the specific order, or all the operations shown have to be performed to achieve an expected result. Additionally, or alternatively, some steps may be omitted, and a plurality of steps are combined into one step to be performed, and/or one step is divided into a plurality of steps to be performed.

A person skilled in the art is to understand that the embodiments of this application may be provided as a method, a system, or a computer program product. Therefore, this application may use a form of a hardware-only embodiment, a software-only embodiment, or an embodiment combining software and hardware. Moreover, a form of a computer program product that is implemented on one or more computer usable storage media (including but not limited to a disk memory, a CD-ROM, an optical memory and the like) that include computer usable program code may be used in this application.

This application is described with reference to flowcharts and/or block diagrams of the method, the device (system), and the computer program product according to the embodiments of this application. It is to be understood that computer program instructions may be used for implementing each process and/or each block in the flowcharts and/or block diagrams and a combination of a process and/or a block in the flowcharts and/or the block diagrams. Such computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

Such computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Such computer program instructions may alternatively be loaded onto a computer or another programmable data processing device, so that a series of operations and steps are performed on the computer or the other programmable devices, thereby generating computer-implemented processing. Therefore, the instructions executed on the computer or another programmable device provide steps for implementing a specific function in one or more processes in the flowcharts and/or in one or more blocks in the block diagrams.

Although the foregoing embodiments of this application have been described, once a person skilled in the art learns a basic creative concept, the person can make other changes and modifications to the embodiments. Therefore, the appended claims are intended to cover the foregoing embodiments and all changes and modifications falling within the scope of this application.

Obviously, a person skilled in the art may make various modifications and variations to this application without departing from the spirit and scope of this application. This application is intended to cover such modifications and variations provided that the modifications and variations of this application fall within the scope of the claims of this application and their equivalent technologies.

What is claimed is:

1. A video file playing method, performed by a terminal device, the method comprising:
    playing a video file, the video file comprising a displayed object;
    playing an animation file frame by frame in a hidden layer synchronously with video file according to a playback time of the video file, the animation file comprising at least two animation elements corresponding to the same displayed object, and the at least two animation elements being associated with different display positions of the displayed object, wherein a movement position of one of the animation elements is kept consistent with a movement position of the corresponding displayed object;
    determining click/tap position information of a screen clicking/tapping event in response to the screen clicking/tapping event being detected;
    determining an animation element display area corresponding to the click/tap position information of the screen clicking/tapping event in the animation file according to the click/tap position information;
    determining, according to the corresponding animation element display area, an animation element triggered by the screen clicking/tapping event, the determined animation element having an associated display position matching the animation element display area in a video frame corresponding to the screen clicking/tapping event; and
    determining an interactive operation corresponding to the triggered animation element and performing the interactive operation.

2. The method according to claim 1, wherein the determining an animation element display area corresponding to the click/tap position information of the screen clicking/tapping event in the animation file according to the click/tap position information of the screen clicking/tapping event comprises:
    determining a click/tap area comprising a click/tap position according to the click/tap position information of the screen clicking/tapping event; and
    determining an animation element display area overlapping the click/tap area in the animation file, and using the determined animation element display area as the animation element display area corresponding to the screen clicking/tapping event.

3. The method according to claim 2, wherein the click/tap position information comprises click/tap coordinates; and
    the determining a click/tap area comprising a click/tap position according to the click/tap position information comprises:
    determining an area comprising the click/tap coordinates as the click/tap area according to the click/tap coordinates of the screen clicking/tapping event.

4. The method according to claim 2, wherein before the determining an animation element display area corresponding to the click/tap position information of the screen clicking/tapping event in the animation file according to the click/tap position information of the screen clicking/tapping event, the method further comprises:
    obtaining, for any animation element in the animation file, display position information of the animation element in a screen coordinate system; and
    determining an animation element display area corresponding to the animation element according to the display position information of the animation element in the screen coordinate system.

5. The method according to claim 4, wherein the obtaining display position information of the animation element in a screen coordinate system comprises:
    determining display position information of the animation element in a video coordinate system according to display position information of a displayed object corresponding to the animation element in different video frames; and
    converting the display position information of the animation element in the video coordinate system into the display position information in the screen coordinate system according to a display parameter of a display screen on which the video file is played.

6. The method according to claim 5, wherein the display position information comprises starting point coordinates of the animation element display area, and a width value and a height value of the animation element display area; and
    the determining an animation element display area overlapping the click/tap area in the animation file comprises:
    determining, for any animation element display area in the animation file, pixel point coordinates in the animation element display area according to starting point coordinates of the animation element display area, and a width value and a height value of the animation element display area; and determining, in response to pixel point coordinates in the click/tap area coinciding with pixel point coordinates in the animation element display area, the animation element display area as the animation element display area overlapping the click/tap area in the animation file.

7. The method according to claim 1, wherein an animation file generated according to the video file is played frame by frame according to the playback time of the video file comprises:
determining a current playback animation frame in the animation file according to a frame rate of a video playback and a current playback position of the video file.

8. The method according to claim 1, wherein:
when the displayed object is at a first display position, the displayed object corresponds to a first animation element; and
when the displayed object is at a second display position, the displayed object corresponds to a second animation element.

9. A video file playing apparatus, comprising: a memory and a processor coupled to the memory, the processor being configured to:
play an animation file frame by frame according to a playback time of a video file, the video file comprising a displayed object, and the animation file comprising at least two animation elements corresponding to the same displayed object, and the at least two animation element being associated with different display positions of the displayed object;
determine click/tap position information of a screen clicking/tapping event in response to the screen clicking/tapping event being detected in the video file playing process;
determine an animation element display area corresponding to the click/tap position information of the screen clicking/tapping event in the animation file according to the click/tap position information of the screen clicking/tapping event;
determine, according to the animation element display area, an animation element triggered by the screen clicking/tapping event, the determined animation element having an associated display position matching the animation element display area in a video frame corresponding to the screen clicking/tapping event; and
determine an interactive operation corresponding to the triggered animation element, and perform the interactive operation.

10. The apparatus according to claim 9, wherein the processor is further configured to determine a click/tap area of a click/tap position according to the click/tap position information of the screen clicking/tapping event; and determine an animation element display area overlapping the click/tap area in the animation file, and use the determined animation element display area as the animation element display area matching the screen clicking/tapping event.

11. The apparatus according to claim 10, wherein the click/tap position information comprises click/tap coordinates; and
the processor is further configured to determine the click/tap area comprising the click/tap coordinates according to the click/tap coordinates of the screen clicking/tapping event.

12. The apparatus according to claim 10, wherein the processor is further configured to:
obtain, for any animation element in the animation file, display position information of the animation element in a screen coordinate system, according to the click/tap position information of the screen clicking/tapping event, before determining the animation element display area corresponding to the screen clicking/tapping event in the animation file; and determine an animation element display area corresponding to the animation element according to the display position information of the animation element in the screen coordinate system.

13. The apparatus according to claim 12, wherein the processor is further configured to determine display position information of the animation element in a video coordinate system according to display position information of a displayed object corresponding to the animation element in different video frames.

14. The apparatus according to claim 13, wherein the processor is further configured to convert the display position information of the animation element in the video coordinate system into the display position information in the screen coordinate system according to a display parameter of a display screen on which the video file is played.

15. A non-transitory computer-readable medium, storing a computer program executable by a terminal device, the program, when run on the terminal device, causing the terminal device to perform:
playing an animation file frame by frame according to a playback time of a video file, the video file comprising a displayed object, and the animation file comprising at least two animation elements corresponding to the same displayed object, and the at least two animation element being associated with different display positions of the displayed object;
determining click/tap position information of a screen clicking/tapping event in response to the screen clicking/tapping event being detected;
determining an animation element display area corresponding to the click/tap position information of the screen clicking/tapping event in the animation file according to the click/tap position information;
determining, according to the corresponding animation element display area, an animation element triggered by the screen clicking/tapping event, the determined animation element having an associated display position matching the animation element display area in a video frame corresponding to the screen clicking/tapping event; and
determining an interactive operation corresponding to the triggered animation element and performing the interactive operation.

16. The computer-readable medium according to claim 15, wherein the determining an animation element display area corresponding to the click/tap position information of the screen clicking/tapping event in the animation file according to the click/tap position information of the screen clicking/tapping event comprises:
determining a click/tap area comprising a click/tap position according to the click/tap position information of the screen clicking/tapping event; and
determining an animation element display area overlapping the click/tap area in the animation file, and using the determined animation element display area as the animation element display area corresponding to the screen clicking/tapping event.

17. The computer-readable medium according to claim 16, wherein the click/tap position information comprises click/tap coordinates; and the determining a click/tap area comprising a click/tap position according to the click/tap position information comprises:

determining an area comprising the click/tap coordinates as the click/tap area according to the click/tap coordinates of the screen clicking/tapping event.

18. The computer-readable medium according to claim 16, wherein before the determining an animation element display area corresponding to the click/tap position information of the screen clicking/tapping event in the animation file according to the click/tap position information of the screen clicking/tapping event, the method further comprises:

obtaining, for any animation element in the animation file, display position information of the animation element in a screen coordinate system; and determining an animation element display area corresponding to the animation element according to the display position information of the animation element in the screen coordinate system.

19. The computer-readable medium according to claim 18, wherein the obtaining display position information of the animation element in a screen coordinate system comprises:

determining display position information of the animation element in a video coordinate system according to display position information of a displayed object corresponding to the animation element in different video frames; and converting the display position information of the animation element in the video coordinate system into the display position information in the screen coordinate system according to a display parameter of a display screen on which the video file is played.

20. The computer-readable medium according to claim 19, wherein the display position information comprises starting point coordinates of the animation element display area, and a width value and a height value of the animation element display area; and the determining an animation element display area overlapping the click/tap area in the animation file comprises:

determining, for any animation element display area in the animation file, pixel point coordinates in the animation element display area according to starting point coordinates of the animation element display area, and a width value and a height value of the animation element display area; and determining, in response to pixel point coordinates in the click/tap area coinciding with pixel point coordinates in the animation element display area, the animation element display area as the animation element display area overlapping the click/tap area in the animation file.

* * * * *